US012753123B2

(12) United States Patent
Cramer et al.

(10) Patent No.: US 12,753,123 B2
(45) Date of Patent: Oct. 6, 2026

(54) PRECERAMIC POLYMER PRINTING BINDERS FOR ADVANCED CERAMICS

(71) Applicants: UT-Battelle, LLC, Oak Ridge, TN (US); The University of Tennessee Research Foundation, Knoxville, TN (US)

(72) Inventors: Corson L. Cramer, Oak Ridge, TN (US); Trevor Aguirre, Oak Ridge, TN (US); Steven E. Bullock, Oak Ridge, TN (US); Amelia M. Elliott, Oak Ridge, TN (US); Greg Larsen, Oak Ridge, TN (US); Tomonori Saito, Oak Ridge, TN (US); Dustin B. Gilmer, Knoxville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 78 days.

(21) Appl. No.: 18/899,081

(22) Filed: Sep. 27, 2024

(65) Prior Publication Data

US 2025/0109075 A1 Apr. 3, 2025

Related U.S. Application Data

(60) Provisional application No. 63/541,574, filed on Sep. 29, 2023.

(51) Int. Cl.

| | |
|---|---|
| ***C04B 35/571*** | (2006.01) |
| ***B28B 1/00*** | (2006.01) |
| ***B28B 11/24*** | (2006.01) |
| ***B33Y 10/00*** | (2015.01) |
| ***B33Y 40/20*** | (2020.01) |
| ***C04B 35/626*** | (2006.01) |
| ***C04B 35/628*** | (2006.01) |
| ***C04B 35/632*** | (2006.01) |
| ***C04B 35/64*** | (2006.01) |

(52) U.S. Cl.

CPC ............ *C04B 35/571* (2013.01); *B28B 1/001* (2013.01); *B28B 11/245* (2013.01); *B33Y 10/00* (2014.12); *B33Y 40/20* (2020.01); *C04B 35/6269* (2013.01); *C04B 35/62834* (2013.01); *C04B 35/62886* (2013.01); *C04B 35/632* (2013.01); *C04B 35/64* (2013.01); *C04B 2235/3826* (2013.01); *C04B 2235/483* (2013.01); *C04B 2235/6026* (2013.01)

(58) Field of Classification Search

None

See application file for complete search history.

(56) References Cited

U.S. PATENT DOCUMENTS

| | | | |
|---|---|---|---|
| 2008/0003794 A1 | 1/2008 | Ramachandrarao | |
| 2010/0210445 A1 | 8/2010 | Von Rymon Lipinski et al. | |
| 2012/0068110 A1 | 3/2012 | Schubert et al. | |
| 2019/0284096 A1 * | 9/2019 | Hoel ..................... | C04B 35/632 |

OTHER PUBLICATIONS

Oropeza, D., et al., “Reactive binder jet additive manufacturing for microstructural control and dimensional stability of ceramic materials”, Additive Manufacturing, Oct. 27, 2021, 12 pages.

Cramer, C. L., et al., “Processing and properties of SiC composites made via binder jet 3D printing and infiltration and pyrolysis of preceramic polymer”, Im. J. Ceramic Eng Sci. Sep. 9, 2020, 2, pp. 320-331.

* cited by examiner

*Primary Examiner* — Virak Nguon

(74) *Attorney, Agent, or Firm* — Scully, Scott, Murphy & Presser, P.C.

(57) ABSTRACT

The present disclosure relates to a binder jet 3D process for preparing a ceramic part in which a binder composition is deposited on a powder material in a binder jet machine during which the binder in the binder composition comprises a preceramic polymer, and the binder impregnates particles of the powder.

26 Claims, No Drawings

PRECERAMIC POLYMER PRINTING BINDERS FOR ADVANCED CERAMICS

STATEMENT REGARDING FEDERALLY SPONSORED RESEARCH

This invention was made with government support under Contract DE-AC0500OR22725 awarded by the U.S. Department of Energy. The government has certain rights in the invention.

FIELD OF THE DISCLOSURE

The present disclosure relates generally to an additive manufacturing method, and more particularly, to a binder jet 3D printing process ("BJ3DP") manufacturing process for making a ceramic part. The present disclosure relates to the use of a binder that can be integrated into a binder jet 3D printing process comprised of a preceramic polymer.

BACKGROUND OF THE DISCLOSURE

Ceramics like SiC possess superior mechanical properties such as hardness, stiffness, and strength as well as thermal and chemical stability, making them useful in a wide range of industrial applications. Traditionally, ceramic components are formed with tooling via injection molding, die pressing, tape-casting, and gel-casting with subsequent debinding and sintering steps, but these methods are limited in producing ceramics having geometric complexity, and tooling causes low throughput and higher costs. SiC in particular is notably difficult to process and shape due to its high hardness and high sintering temperatures.

Additive Manufacturing (AM) has the potential to produce ceramic parts with high geometric complexity and creates a high demand for ceramic product customization tailored to individual customers' needs. There is a commercial demand for additively manufactured (3-D-printed) ceramics in many fields including industrial filtration, (e.g., molten metal fibers, flow separators, and the like); metal processing (e.g., casting molds/blanks), implantable dental and medical devices, and semiconductor processing. Additive manufacturing of ceramic materials is also of interest for propulsion components, thermal protection systems, porous burners, microelectromechanical systems, and electronic device packaging to name just a few of the products prepared from 3-D printed ceramics.

With respect to ceramics, there are three leading AM technologies for shaping complex ceramic preforms (and they all require similar post-processing): stereolithography in the form of ceramic photolithography, robocasting/direct ink writing or gel (slurry, paste) extrusion, binder jet 3D printing (BJ3DP), and selective laser sintering. Stereolithography utilizes monomer resins loaded with powder and relies on selective curing of 2D layers. SiC preforms have been made with lithography, however, these preforms require excessive processing times because the light absorption of SiC powder reduces the penetration depth of the laser, requiring much longer exposure times. Stereolithography can also be used to form preceramic polymers without particles. Robocasting utilizes solvent, gel, or paste slurries that are extruded through a nozzle and selectively drawn. Green SiC objects have been made with robocasting, but the drawbacks of this process are low resolution and low volume throughput. BJ3DP utilizes a dry powder bed where a binder is selectively deposited via inkjet onto the powder bed in 2D layers. BJ3DP can achieve much higher throughput with very high resolution compared to other methods, making BJ3DP a viable technology for mass production of complex ceramic components. It is also the most preferred AM method for large monolithic parts in complex shapes.

One drawback to BJ3DP, however, is the binder has to be removed by burning it out of the parts before or during post-processing. The current state of the art uses a binder that give the strength to the printed parts prior to sintering, but as the binder gets burned out the "brown parts" are very weak and difficult to transport. The parts printed with binder jet currently do not have sufficient strength after binder burnout for the process to be compatible with industrial operations, and densification can be time and cost intensive. Thus, a new binder is needed to not only improve the strength of BJ3DP parts after binder burnout, but also to contribute to densification to speed up the post processing steps.

SUMMARY OF THE DISCLOSURE

The present disclosure relates to a binder jet 3D process for preparing a ceramic part comprising (a) depositing a layer of powder material on a working surface of a binder jet machine; (b) depositing a first binder composition comprising a printing binder into the layer of powder material; (c) selectively printing the binder into the layer of powder material in a first pattern to generate a printed layer, wherein the pattern is representative of a structure of a layer of the ceramic part; (d) curing the binder to generate a green body part which comprises the cured printed layer; (e) depositing another layer of powder material onto the green body part; (f) repeating steps (b), (c), and (d) in a layer-by-layer manner until all of the layers of the entire green body part have been printed; (g) curing the entire green body part of step (f); and (h) pyrolyzing the green body part into a brown part at a temperature effective to consolidate and densify the printed layers of powdered material, (i) impregnating the brown part with a second composition comprising a PIP densification binder and pyrolyzing the resulting impregnated brown part to further densify the brown part and (j) repeating step (i) until the ceramic part is prepared, said binder in the binder composition independently comprising one or more preceramic polymers comprising polymeric species comprising silicon (hereinafter referred to as "silicon based polymers"). The silicon element may be present in the backbone, or on functional groups or in ring structures, such as, for example, in silicone based polymeric species. The silicon-based polymeric species have a molecular weight ranging from about 100 to about 10,000 Daltons. The binder composition has an Ohnesorge number ranging from about 0.1 to about 1.0. In an embodiment, the binder and PIP densification resin are the same. In another embodiment, the printing binder and PIP densification resin compositions are different. The PIP densification resin in an embodiment comprises a second preceramic polymer. In an embodiment, the second preceramic polymer is a standard preceramic polymer used in the art. In another embodiment, the second preceramic polymer in the PIP densification resin is the preceramic polymer of the present disclosure.

DETAILED DESCRIPTION OF THE DISCLOSURE

One or more specific embodiments will be described below. In an effort to provide a concise description of these embodiments, all features of an actual implementation may not be described in the specification. It should be appreciated that the development of any such actual implementation, as in any engineering or design project, to achieve the developers' specific goals, such as compliance with system-related and business related constraints, may vary from one implementation to another. Moreover, it should be appreciated that such a development effort might be complex and time-consuming, but would nevertheless be a routine undertaking of design, fabrication and manufacturing for those of ordinary skill having the benefit of the present disclosure.

As used herein, the singular forms "a." "an," and "the" include plural referents unless the context clearly indicates otherwise.

Unless defined to the contrary, all technical and scientific and scientific terms used herein have the same meaning as is commonly understood by one of ordinary skill in the art.

Further, unless otherwise indicated, all numbers expressing conditions, concentrations, dimensions, and the like used herein are to be understood as being modified in all instances by the term "about." Accordingly, unless indicated to the contrary, the numerical parameters set forth in this specification are modified by the term "about," which define approximations that may vary, depending upon at least upon a specific analytical technique. Alternatively, "about" can mean a range of up to 10% in an embodiment, and in another embodiment, a range of up to 5%, and/or in a further embodiment, a range of up to 1% of a given value. About" and "approximately" are used interchangeably herein.

The term "comprising," which is synonymous with "including," "containing" or "characterized by" is inclusive or open-ended and does not exclude additional, unrecited elements or method steps. "Comprising" is a term of art used in the present disclosure and in claim language which defines the essential elements, but other claim elements may be added and still form a construct within the scope of the claim.

As used herein, the phrase "consisting of" excludes any element, step, or ingredient not specifically specified in the present disclosure or claim. When the phrase "consists of" (or variations thereof) appears in a clause of the body of a claim, rather than immediately following the preamble, it limits only the element set forth in that clause; other elements are not excluded from the claim as a whole.

The term "consisting essentially of" limits the scope of a claim to the specified elements or method steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups which list the elements in the group. Thus, in some embodiments, not otherwise explicitly recited, any instance of "comprising" may be replaced by "consisting of" or alternatively, by "consisting essentially of."

The term "preceramic" in this disclosure refers to the capability to be ultimately converted to a ceramic material. A preceramic composition is a composition is a composition that can be converted into a ceramic material, either directly (e.g., by pyrolysis) or via multiple steps (e.g., by polymerization followed by pyrolysis). In particular, a preceramic composition may contain a preceramic polymer that can be pyrolyzed into a ceramic material.

A "preceramic polymer" is characterized in that at least some of the polymer converts to a ceramic material when heated to a temperature above 200° C. at atmospheric pressure in a substantially inert gas environment. In an embodiment, at least 50 wt %, and in another embodiment, at least 90 wt % and in a further embodiment, at least 99 wt % and in a further embodiment, all of the polymer converts to a ceramic material when heated above 200° C. at atmospheric pressure in a substantially inert gas environment. Thus, a preceramic polymer is converted or considered converted to a ceramic part, in an embodiment when 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 100 wt %, or any value therebetween is converted to a ceramic material. The preceramic polymer is further defined hereinbelow.

The term "binder," unless indicated to the contrary, refers to preceramic polymer, as defined herein and described in the present disclosure.

The term "binder composition," unless indicated to the contrary, refers to a composition comprised of the binder and a carrier (solvent) and any other additive that may be present.

As used herein, a substantially inert gas environment refers to at least 95% of the environment contains the inert gas. The term inert gas refers to a gas that is not reactive under the conditions of heating the preceramic polymer to a temperature of greater than 200° C. Examples include helium, neon as well as other inert gases in the periodic table, and nitrogen or other gas known to the skilled artisan that does not react with preceramic polymer under these conditions.

The term "liquid," as used herein, refers to the binder composition, as described herein, being a liquid at room temperature, which is at about 25° C.

Moreover, the singular also includes the plural and vice versa unless it is obvious that it is meant otherwise.

Further, unless expressly stated to the contrary, "or" refers to an inclusive "or" and not to an exclusive "or." For example, a condition A or B is satisfied by any one of the following: A is true (or present), and B is false (or not present), A is false (or not present), and B is true (or present), and both A and B are true (or present).

Moreover, the term "and/or" is synonymous with the term "or," as used herein.

When a range of values is expressed, an embodiment includes the endpoint of the ranges and all the points therebetween. For example, a range of 6 to 9, includes the value 6 and 9 and all values therebetween. Similarly, when values are expressed as approximations, by use of the antecedent "about," it will be understood that the values range from about the two endpoints, where "about" is defined as herein described. All ranges are inclusive and combinable.

Unless indicated to the contrary, all percentages are by weight.

As defined herein, the "green body part" is intended to denote a printed ceramic part that has not undergone heat treatment to remove the binder therefrom.

The "brown body part," as defined herein, denotes a printed ceramic part that has undergone heat treatment to remove the binder from the green body part.

As used herein, the term printing binder and binder are synonymous and are being used interchangeably.

The present disclosure relates to the method of preparing a ceramic part utilizing binder jet 3D printing ("BJ3DP"). The present process utilizes a binder in a binder composition comprised of a preceramic polymer and solvent. It is a liquid at room temperature.

In an embodiment, the preceramic polymers utilized in the present disclosure are polymers that predominantly contain silicon in the polymer backbone and upon pyrolysis, convert from a polymer to a ceramic by reordering the molecular structure thereof. They include silicon-based polymeric species. More specifically, these preceramic polymers utilized as the binder include, for example, polymers of siloxane, silazanes, silane, or carbosilane based materials. In addition, they may contain silyl, methyl, allyl, vinyl, phenyl, carbonyl, or other aromatic moieties. For example, these preceramic polymers binder may be a poly(carbosilane), poly(silazane), poly(silsesquioxane), poly(siloxane), poly (borosiloxane), poly(borosilane), poly(borosilazine), poly (carbosiloxane), poly(silycarboimides), poly(silesequicarbodiimides), polyborazines or combination thereof. In an embodiment, the preceramic polymer is a poly(silazane), poly(siloxane), poly(borosilane), poly(carbosiloxanes), or combination thereof. The preceramic polymers includes polymers that produces a silicon or boron-based ceramic material upon pyrolysis and include, but not limited to siliconoxycarbide (SiOC), silicon carbide (SiC), silicon nitride ($Si_3N_4$), silicon oxynitride (SiON), silicon boronitride (SiBN), silicon boron carbonitride (SiBCN), silicon metal carbides, silicon metal oxides, silicon metal nitrides, $Si_2ON_2$, $SiO_xN_y$, where x is a rational number ranging from 0 to 1, and y is a rational number ranging from 1 to 0 and x+y=1, SiAlON, SiONB, and SiONCB or combination thereof. Some of the commercial preceramic polymers for binders include a silicon carbide matrix polymer precursor, such as StarPCS™ SMP-10, a polycarbosilane polymer precursor, such as StarPCS™ SMP877, or StarPCS™ SMP-500, or a polycarbosiloxane precursor polymer such as EEMS MS-154 or Durazane 1800, which has the molecular structure $[—NH—Si(CH{=}CH_2)(CH_3)—]_{0.2n}$. $[—NH—Si(H)(CH_3)—]_{0.8n}$, where n is an integer. In an embodiment, the binder in the binder composition is formulated from commercially available preceramic polymers as the base material.

In an embodiment, the preceramic polymer is prepared from monomers by polymerizing the monomer at 100° C. or less. In an embodiment, the preceramic polymers as binders are not prepared by free radical polymerization. In an embodiment, photoinitiators are not utilized to prepare the preceramic polymers used in the present disclosure. In an embodiment, the preceramic polymers are not uv-cureable preceramic polymers.

The number average molecular weight of the preceramic polymer ranges from about 100 to about 10,000 Daltons/mole. In an embodiment, the number average molecular weight of the preceramic polymer ranges from about 1000 to about 8,000 Daltons per mole and in another embodiment, from about 1200 to about 7,000 Daltons per mole.

Many commercially available PCP's have properties that fit this rheological criteria, but if a PCP of interest does not fit these specific characteristics it is possible to tune the rheology with additives such as solvents that would allow the PCP to fit into the rheological window that is necessary. Once the binder has the correct rheological characteristics, it can be incorporated into the powder bed.

The binder composition comprises a carrier, which is a solvent normally mixed with binders. The solvent may be aqueous or non-aqueous. The solvent is generally non-reactive, i.e., inert with the powder, the preceramic polymer in the binder composition or any other additive that may be present in the binder composition. Additionally, in general, the solvent should readily evaporate after selective deposition of the binder composition into the powder layer, which may facilitate curing to bond together the binder-coated particles of the printed layers, The solvent may be water or liquid hydrocarbons having a boiling point in the range from about 40° C. to about 100° C., or an alcohol or acetone or mixtures thereof. Examples of solvents include, but not limited to water, chloroform, pentane, hexane, heptane, octanes, benzene, xylene, mesitylene, decalin, ether, toluene, anisole, methanol, ethanol, n-propanol, n-butanol, isobutanol, isopropanol, methylene chloride, acetone, 2-butanone, 2-metoxyethanol, diethylene glycol, tetrahydrofuran, trichloroethylene and the like.

The surface tension of the binder composition ranges from about 20 to about 40 mPA.

The binder used in the present process is printable. As a result, the binder has the correct rheological characteristic for utilization within the printhead delivery mechanism. One of these criteria that is key to the printability is the Ohnesorge number (Oh). The Ohnesorge number was first identified by Fromm to characterize droplet formation for inkjet printing, and described as follows:

$$Oh = (WE)^{1/2}/Re = \mu/(\rho\gamma D)^{1/2} \quad (1)$$

$$We = \rho V^2 D/\gamma \quad (2)$$

$$Re = \rho VD/\mu \quad (3)$$

where μ is dynamic viscosity, ρ is the density, γ is the surface tension of the binder respectively, D is the nozzle diameter of the printhead (Eq. 1), We is the Webers Number (Eq.2), V is velocity of the droplet, and Re is the Reynolds number (Eq. 3). These numbers give a guideline of the printability of a fluid utilizing inkjet technology. The Ohnesorge number (Oh) is a dimensionless number that relates the viscous forces to inertial and surface tension forces. It is approximately equal to viscous forces/(inertia forces times surface tension.

In inkjet printing, liquids whose Ohnesorge number are in the range $0.1<Oh<1.0$ are jettable. The binder composition comprising preceramic polymers used as binders in this disclosure are jettable, wherein the Ohnesorge number are in the range $0.1<Oh<1$.

Generally speaking, jetting of a material means that droplets of a build material, which in this disclosure is the binder, as defined herein, are selectively deposited onto a build bed, which in this disclosure in a powder material bed or the partial green body part to develop a three-dimensional object jetting is carried out by various techniques known to the skilled artisan. For example, jetting can be carried out by liquid deposition, vapor deposition or liquid-vapor mist deposition as, for instance, via spraying (such as via nozzle in communication with a material under pressure), impingement (such as via a tube or pipe in communication with a material that is pumped) or by other means known in the art. Jettable, as used herein, means that the material, such as the binder composition, as defined herein, is capable of being deposited or jetted onto powder material bed or layer of powder material impregnated with a binder composition.

The binder composition may include additives that facilitate deposition of the binder onto the layer of powder. For example, the binder composition may include viscosity modifiers, dispersants, stabilizers, surfactants or any other suitable additive that may facilitate jettability of the binder solution and selective deposition of the binder composition onto the powder material layer, or initially onto the powder material bed. For example, in an embodiment, the binder composition includes surfactants. The surfactants may be ionic (e.g., zwitterionic, cationic, anionic) or non-ionic, depending on the properties of the binder and/or the powder. By way of non-limiting example, the surfactant may be polypropoxy diethyl methylammonium chloride, e.g., VARIQUAT® CC4Croda Inc. located in Snaith, England, available from Evonik located in Essen, Germany, and/or a polyester/polyamine condensation polymer (e.g., Hyper KD2), available from Croda Inc., located in Snaith, England, in an another embodiment. In certain embodiments, the one or more additives may improve the wettability of the powder to facilitate coating the powder particles with the binder composition. The one or more additives may modify the surface tension of the binder composition to facilitate jettability of the binder composition. As described hereinabove, the binder composition is jettable since the Ohnesorge number (e.g., the ratio of viscous forces to inertial and surface tension) ranges from about 0.1 to about 1.

Another additive that may be present in the binder composition is a crosslinker or plasticizer, which aids in bonding the powder material to the binder. These crosslinkers are known to the skilled artisan. Examples of useful plasticizers include dimethylsilaethane, vinyl terminated dimethylsiloxane, and dimethylsiloxane-diphenylsiloxane copolymer, and the like. In an embodiment, the crosslinker is a silane.

An additional additive that may be present in the binder composition is a catalyst that helps bind the binder to the powder particles. These catalysts are known to one of ordinary skill in the art. Non-limiting examples include Pt-polydimethylsiloxane complex and Pt-cyclomethylvinylsiloxane complex, and the like.

The preceramic polymer may additionally be comprised of one or more refractory elements. By refractory elements, it is understood to be an element known to the skilled artisan that is highly resistant to heat and wear. Examples include Zr, B, Hf, Mo, Ta, W, Ti, Ta, W, Ti, La, Re, Ir and Nb, and the like. The one or more refractory element may, in an embodiment, be a refractory metal, which is a metallic element known to the skilled artisan that is highly resistant to heat and wear. Examples include Zr, Hf, Mo, Ta, W, Ti, Ta, W, Ti, La, Re, Ir and Nb, and the like. In an embodiment, the refractory element may be present in one or more parts of the preceramic polymer, for example, the backbone of the preceramic polymer or in a side chain or ring structure of the preceramic polymer or any combination thereof. In an embodiment, the refractory element Specifically, to make a fully crosslinked and strong green ceramic parts with binder jet 3D printing that can be further processed with polymer impregnation and pyrolysis (PIP), a ceramic and/or preceramic powder material is used with a binder formulated with preceramic polymer, crosslinker, and catalyst or any combination of the three constituents.

The base preceramic polymer for the binder may or may not be modified with crosslinker and/or catalyst to achieve gelation near room temperature through careful selection of crosslinker and catalyst percentages.

The powder material used in the present process may be commercial grade ceramic powder as received, or it may be blended with compositions used in the art of BJ3DP processing, such as bimodal powder size blend, powders with sintering aids in them, or agglomerated powders. However, it may also but may not also contain crosslinker and/or catalyst. The catalysts or crosslinkers would be added by mixing or coating with a solvent and drying process. The powder or particulate in the bed may be irregular or regular shaped, spherical, agglomerated, spray died, or it may be in a milled or chopped fiber form with aspect ratios ranging from about 10 to about 2000. The powder material may be but are not limited to $Si_3N_4$, $Si_2ON_2$, $SiO_xN_y$, SiAlON, SiC, SiOC, SiON, SIONB, SiONCB, HfC, ZrC, TaC, Mo, W, Ti, $HfB_2$, $ZrB_2$, $TaB_2$, $MoSi_2$, $WSi_2$, where x is value ranging from 0 to 1, and y is a value ranging from 1 to 0, wherein x+y=1. In an embodiment, the powder material is SiC.

The process of the present disclosure uses common binder jet 3D printing equipment to load powder material into the powder bed and the binding composition, as defined herein, comprising preceramic polymer binder into the print head. The powder bed consists of a ceramic material that may or may not have crosslinker and/or catalyst in it. This can be incorporated with a solid or a coating mechanism with a media.

The binder composition described hereinabove is used in additive manufacturing, also known as 3D printing, which generally involves printing an article one layer at a time. More specifically, the BJ3DP process for preparing the ceramic part comprises (a) depositing a layer of powder material on working a surface of a binder jet machine; (b) depositing a binder composition comprising a binder into the layer of powder material; (c) selectively printing the binder composition into the layer of powder material in a first pattern to generate a printed layer, wherein the pattern is representative of a structure of a layer of the ceramic part; (d) curing the binder to generate a green body part which comprises the cured printed layer; (e) depositing another layer of powder material onto the green body part; (f) repeating steps (b), (c), and (d) in a layer-by-layer manner until all of the layers of the entire green body part has been printed; (g) curing the entire green body part of step (f); and (i) pyrolyzing the green body part to produce a brown part at a temperature effective to consolidate and densify the printed layers of powdered material bounded by converted preceramic polymer (which pyrolyzes to amorphous ceramic), To reach higher density, the brown part must be PIP densified several times with a second composition comprising a PIP densification resin to reach high density, but at least one less cycle is needed by using the preceramic polymer of the present disclosure as the binder, wherein PIP densification resin comprises a second preceramic polymer which impregnates the brown body part followed by pyrolysis. In an embodiment, the binder comprising a first preceramic polymer, as defined herein, is the same preceramic binder in the PIP densification resin In another embodiment, the preceramic polymer in the PIP densification resin is the standard preceramic polymer used in the art, and is not the same as the preceramic polymer used in the binder described herein. In another embodiment, the printing binder composition may be the same as or different from the PIP densification resin composition, In an embodiment, the printing binder and the PIP densification resin are the same. In an embodiment, the printing binder composition and the PIP densification resin composition are the same.

Generally, in a BJ3DP process, the powder material is placed on a working surface of the binder jet printer. The working surface denotes a surface onto which a powder bed layer is deposited during binder jet printing processes. The working surface may include a working platform of a binder jet printer, a layer of powder, or a binder printed layer. The binder composition is deposited, i.e., jetted, into the layer of powder material to bind the binder to the powder material on the working surface. The binder is selectively deposited into the layer of powder material, i.e., it is printed in a predetermined pattern that is representative of the layer of the ceramic part that is being produced to generate a binder printed layer of powder material. In other words, the binder coats the powder material particles within the powder material layer, thereby generating binder coated particles within the powder material layer. In other words, the binder comprised of preceramic polymers impregnates powder material particles. This jetting step is conducted at effective temperatures. In an embodiment, the temperature for this step ranges from about 25° C. to about 100° C. As discussed below, after curing, the binder bonds the binder coated particles to one another or to the working surface according to a predetermined pattern to form a binder printed layer of powder of the green body part. As defined herein, the green body of the printed part is intended to denote a printed part that has not undergone heat treatment to remove the binder therefrom.

Following deposition of the binder composition into the powder material layer and the selective printing of the binder, the binder composition is cured using techniques known in the art, for example, via heat, light, moisture solvent evaporation and the like. The curing helps bonding the powder material particles together and form a cured layer of the green body part. For example, the solvent in the binder composition may be evaporated at an effective evaporation temperature that allows for efficient bonding of the printed layers and allows for efficient bonding of the printed layers of the green body part. In an embodiment, the curing temperature may range from about 60° C. to about 200° C. The resulting green body part is dried using techniques known to the skilled artisan.

Thus, in the present process, curing occurs once jetted and combined with powder material in the powder material bed enabling faster throughput of green bodes that can be handled and have higher strength than using current binders. Powder material with different surface chemistry, oxide vs. non-oxide, are tailored for maximum wetting dispersion through careful section of silane and/or titanate coupling agents. Once both powder material and binder are loaded into the binder jet 3D printing system, the binder will be jetted into the powder bed in a 2D slice of the object that is being printed. For the given layer height, the binder will deposit and wick into the powder layer and will begin to gel to make a rigid layer of crosslinked preceramic polymer that binds the ceramic powder together.

After depositing and either fully or partially curing the first layer, the process may be repeated. The powder material is deposited on the previous cured printed layer of the green body part and the binder composition is successively deposited onto the previous deposited powder material in the manner described above. This repetition of steps described hereinabove of fabricating the green body part in a layer-by-layer manner is continued until all of the layers of the entire green body part has been printed. The binder composition bonds (e.g., adheres, anchors, binds) each successive layer and provide a degree of strength (e.g., green strength) to the printed article to improve the integrity of the structure of the green body part during post printing processes (e.g., debinding, pyrolysis, and the like). That is, the green body strength provided by the binder in the binder composition maintains bonding between the powder material particles within each of the layers of the green body, and blocks (e.g., resists, prevents) delamination of the layers during handling and post-printing processes of the green body part. After each layering step, the resulting partial green body further undergoes curing. For example, it is heated to a temperature effective for curing. In an embodiment the heating temperature ranges from about 190° C. to about 250° C. During these repetitive processes, crosslinking of the powder material particles to the binder should have occurred. When the layering is completed, and the green body part is fully formed, the printed green body undergoes pyrolysis.

In an embodiment, during this process, the powdered material particles may not have been crosslinked or gelled. Under these circumstances, the green body part is further cured under conditions to effect crosslinking of the powder material particles to the binder. In an embodiment, the green body is heated to a temperature that is approximately 500° C. or less, such as from about 250° C. to about 450° C. to promote and effect crosslinking of the powder material particles to each other and to the binder.

Finally, the method continues with pyrolyzing the green body part to consolidate the powder material and generate a consolidated additively manufactured part. During the pyrolysis step, the green body part is heated to a high temperature, which consolidates (e.g., densities, connects) the powdered material of the printed layers of the brown body to form the consolidated part (e.g., substantially solid part). This pyrolysis step converts the green body part to a brown body part, wherein the binder is substantially removed from the green body part. The conditions to which the printed green body part is exposed during debinding (e.g., removal of the binder from the printed layers of the printed green body part) may decompose the binder into smaller molecules that may be readily released from the printed green body part and generate the brown body part having a substantial portion (e.g., approximately 95%, approximately 96%, approximately 97%, approximately 98%) of the binder removed. In certain embodiments, a portion of the binder and/or decomposition products of the binder (e.g., oxides, such as silicon oxide, if present) may remain in the brown body part and may improve bonding of the powder within the brown body part, enabling an improved brown strength that maintains the structure of the brown body part. It also imparts strength and integrity to the brown body part such that the consolidated part is ready for PIP densification and then later suitable for use in machinery for its intended application (e.g., as a component of a gas turbine engine or a gasification system). The pyrolysis temperature is a temperature that is generally less than (e.g., approximately 30% of) the melting point of the powdered material, such that the particles of the powdered material soften and form connections (e.g., necks or bridges) that bind together neighboring particles in the brown body part. In general, pyrolysis temperatures range from about 800° C. to greater than 1200° C., for example, about 850° C., depending on the properties of the powder material used to fabricate the part. After this step, the ceramic part is strong and ready for PIP densification.

PIP processing is performed in repeated, tailored cycles of infiltration followed by pyrolysis to densify the brown body part. In PIP processing a second binder composition comprising a second binder may be utilized and deposited onto the brown body part and is impregnated into the brown body part followed by pyrolysis to densify the brown part. This is repeated until the ceramic is formed.

The PIP densification resin may be the same or different from the printing binder. In an embodiment, the printing binder and the PIP densification resin are the same.

The present inventors have found that when the binder in binder jet 3D printing process comprises preceramic polymer (or even polymerizable monomer which polymerizes in situ), not only is the process sped up, but the ceramic parts are produced with high green strength which translates into brown parts that are made stronger. The preceramic polymers have also been found to be excellent binders and joiners of materials, as they adhere tenaciously to most materials, allowing for the creation of high strength green parts which in the past has been a challenge when joining ceramic materials.

With the use of the preceramic polymers as binders, the saturation value is close to 100% or greater. Saturation, by definition, is the % of void space in powder filled with the liquid binder composition during print. This allows the researcher to control the final properties of the part being created due to the amount of polymer utilized. If the saturation is lower, such as 50%, the part incorporates less polymer and upon pyrolysis it would be less dense, but by increasing the saturation say to 100% or greater the preform upon pyrolysis would consolidate to high density and only need another polymer impregnation and pyrolysis step.

Further, by this process, impregnation and pyrolysis is accelerated. More specifically, the binder deposited in the BJ3DP process will burn out or pyrolyze to form new, solid ceramic parts from the initial powder used, such as, for example, SiC, which securely links the printed SiC particles and reduces the amount of post-processing to reach the desired density. The preceramic polymer binder can convert to the same material as the printed material or convert to a compatible composite material, such as $ZrB_2$.

The use of preceramic polymers provides a more efficient BJ3DP process. At least two processing steps are eliminated-one less polymer impregnation step and pyrolysis step is used. Typically, at least five steps are needed. By crosslinking and using preceramic polymers as a binder, the present process will require less PIP cycles compared to if normal sacrificial binder are used.

Further, the brown part does not have a weak structure during processing because the binder contributes to matrix and starts building a network. This is in contrast to the typical process, where typically fugitive binders, or binders that will burnout or char to form small percentage of carbon, are used and then PIP densification is done after, creating a weaker brown part in comparison to the present process where preceramic polymers are used as the binder because the part will not have any material holding it after the sacrificial binder burnout. Even if preceramic polymer is PIP densified into parts that have not been debinded of the sacrificial binder, the PIP densification has to start after the printing process whereas the PIP densification process is already started by using preceramic polymer binder. This process of the present disclosure saves cost and provides stronger green and brown parts.

Binding the ceramic powder using the binder composition comprised of preceramic polymers, as described herein, creates a gapless interface between the ceramic powder material and the preceramic polymer material. This is an improvement over current binders, which are sacrificial and burn away during pyrolysis and decrease contact between the binder and the powder material. If current sacrificial binders are used, curing and possible debinding of the sacrificial binder can be done to allow preforms to be impregnated by preceramic polymer, which adds more processing steps and affects the matrix to powder interface. Also, if current sacrificial binders are used and debound, it makes the impregnation process more likely to cause deformation and distortion due to the low strength of the brown ceramic parts during the first impregnation and curing. If the preceramic polymer is utilized, then the debound brown ceramic part will have higher strength due to the ceramic phases produced during the debinding process. By using the preceramic polymer/powder system, two processing steps are eliminated, the part is fully bound with preceramic polymer for further polymer impregnation and pyrolysis processing, and the preceramic polymer is added at the layer scale (which allows for improved shape control through the first pyrolysis step).

By utilizing a preceramic polymer as a non-sacrificial binder in the BJ3DP process, the final parts property of the ceramic part, such as shrinkage, density, mechanical strength, and thermal diffusivity can be easily fine-tuned to the predetermined specifications.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed:

1. A process for preparing a ceramic part comprising (a) depositing a layer of powder material on a working surface of a binder jet machine; (b) depositing a printing binder composition comprising a binder into the layer of powder material; (c) selectively printing the binder into the layer of powder material in a first pattern to generate a printed layer, wherein the pattern is representative of a structure of a layer of the ceramic part; (d) curing the binder to generate a green body part which comprises the cured printed layer; (e) depositing another layer of powder material onto the green body part; (f) repeating steps (b), (c), and (d) in a layer-by-layer manner until all of the layers of the entire green body part have been printed; (g) curing the entire green body part of step (f); and (h) pyrolyzing the green body part into a brown part at a temperature effective to consolidate and densify the printed layers of powder material, (i) impregnating the brown part with a second binder composition comprising a polymer infiltration and pyrolysis (PIP) densification resin and pyrolyzing the resulting impregnated brown part to further densify the brown part and (j) repeating step (i) until the ceramic part is prepared, said printing binder and second binder compositions independently comprising one or more preceramic polymers, wherein the one or more preceramic polymers comprise silicon based polymeric species, each having a molecular weight ranging from about 100 to about 10,000 Daltons, said printing binder composition having an Ohnesorge number ranging from about 0.1 to about 1.0.

2. The process according to claim 1 wherein the binder is a polymer of siloxane, silazane, silane, or carbosilane.

3. The process according to claim 1 wherein the binder is an organometallic of silicon or other refractory metal.

4. The process according to claim 3 wherein the binder is a poly(silazane), poly(siloxane), poly(borosilane), poly(carbosiloxanes), or combination thereof.

5. The process according to claim 3 wherein the organometallic contains a refractory element in backbone, side chain, or ring structure thereof and the refractory element is selected from Zr, B, Hf, Mo, Ta, W, Ti, La, Re, Ir, and Nb.

6. The process according to claim 1 wherein the binder is a poly(carbosilane), poly(silazane), poly(silsesquioxane), polysiloxane, poly(borosiloxane), poly(borosilane), poly(borosilazine), poly(carbosiloxane), poly(silycarboimides), poly(silesequicarbodiimides), polyborazines or combination thereof.

7. The process according to claim 1 wherein the one or more preceramic polymers produce upon pyrolysis silicon or boron-based ceramic selected from siliconoxycarbide (SiOC), silicon carbide (SiC), silicon nitride ($Si_3N_4$), silicon oxynitride (SiON), silicon boronitride (SiBN), silicon boron carbonitride (SiBCN), silicon metal carbides, silicon metal oxides, silicon metal nitrides, $Si_2ON_2$, $SiO_xN_y$, SiAlON, SiONB, and SiONCB or combination thereof, wherein x ranges from 0 to 1, and y ranges from 1 to 0 and x+y=1.

8. The process according to claim 1 wherein the one or more preceramic polymers are one or more silicon carbide matrix polymer precursors, one or more polycarbosilane polymer precursors, or one or more polycarbosiloxane precursor polymers.

9. The process according to claim 1 wherein the one or more preceramic polymers are commercially available.

10. The process according to claim 1 wherein the binder composition additionally comprises an additive.

11. The process according to claim 10 wherein the additive is a surfactant, crosslinker, or catalyst.

12. The process according to claim 11 wherein the crosslinker is dimethylsilaethane or siloxane.

13. The process according to claim 10 wherein the additive is a silane.

14. The process according to claim 1 wherein the binder composition has a viscosity ranging from about 10 to about 1000 cP.

15. The process according to claim 1 wherein the binder composition has a surface tension ranging from about 20 to about 40 mPa.

16. The process according to claim 1 wherein the one or more preceramic polymers contain one or more refractory elements.

17. The process according to claim 16 wherein the one or more refractory elements are present in a preceramic polymer backbone, side chain or ring structure or combination thereof, wherein the refractory element is selected from Zr, B, Hf, Mo, Ta, W, Ti, La, Re, Ir, and Nb.

18. The process according to claim 1 wherein the powder material is a commercial grade ceramic powder.

19. The process according to claim 1 wherein the powder material is blended with bimodal sizes of powder, sintering aids, or agglomerated powders.

20. The process according to claim 1 wherein the powder material additionally comprises a crosslinker, a catalyst or combination thereof.

21. The process according to claim 20 wherein the powder material or particles therein are irregular or regular shaped, spherical, agglomerated, spray dried, or it may be in a milled or chopped fiber form with aspect ratios ranging from about 10 to about 2000.

22. The process according to claim 1 wherein the powder material is $Si_3N_4$, $Si_2ON_2$, $SiO_xN_y$, SiAlON, SiC, SiOC, SiON, SiONB, SiONCB, HfC, ZrC, TaC, Mo, W, Ti, $HfB_2$, $ZrB_2$, $TaB_2$, $MoSi_2$, or $WSi_2$, wherein x ranges from 0 to 1, and y ranges from 1 to 0 and x+y=1.

23. The process according to claim 1 wherein the binder is a polycarbosiloxane or a polycarbosilane polymer precursor, and the powder material is SiC.

24. The process according to claim 1 which additionally comprises fully curing the printed part of the green body part after step (g) and prior to step (h) for additional gelling and/or solidification of the binder after deposition into the powder material.

25. The process according to claim 1 wherein the printing binder and the PIP densification resin are the same.

26. The process according to claim 1 wherein the one or more preceramic polymers in the printing binder and the preceramic polymer in the PIP densification resin are the same.

* * * * *